Jan. 27, 1970  E. L. KILAYKO  3,491,788
AIR BLEED AND SYPHON BREAKER VALVE CONSTRUCTION
Filed June 27, 1966

United States Patent Office 3,491,788
Patented Jan. 27, 1970

3,491,788
AIR BLEED AND SYPHON BREAKER
VALVE CONSTRUCTION
Enrique Locsin Kilayko, Auburndale, Mass., assignor to Precision Chemical Pump Corporation, Waltham, Mass., a corporation of Massachusetts
Filed June 27, 1966, Ser. No. 560,680
Int. Cl. F16k 45/00, 15/04; E03c 1/10
U.S. Cl. 137—218                                      6 Claims

ABSTRACT OF THE DISCLOSURE

Air bleed and syphon breaker valve construction in which two ball check valves are located in the flow channel between the inlet and outlet openings and in which a vent opening is positioned adjacent one of the inlet and outlet openings; one of the ball check valves is movable between the vent opening and the adjacent one of the inlet and outlet openings normally closing the vent opening but movable to open the vent opening and to close the adjacent other opening upon pressure decrease.

---

This invention relates to air bleed (automatic priming) and syphon breaker valves.

The purposes and general functions of air bleed and syphon breaker valves are well understood by those skilled in the art. It is a principal object of the present invention, however, to provide a novel structural design therefor which is of extreme simplicity and which provides a highly effective valve for either purpose. Valves according to the present basic design require only minor changes for use for either purpose.

It is another object of this invention to provide a valve which may be directly connected to a pump as a substitute for the usual discharge valve of the pump.

Valves according to the present invention are provided with inlet and outlet openings and a flow channel therebetween. A vent opening communicates through the valve adjacent one of the other openings, preferably of substantially equal diameter relative thereto and coaxially therewith. Pressure responsive means are provided at the one opening and vent for opening said one opening and closing said vent in response to pressure increase and for closing said one opening and opening said vent in response to pressure decrease. Pressure responsive check valve means are likewise positioned at the other of said inlet and outlet openings for opening said other opening in response to pressure increase and for closing said other opening in response to pressure decrease.

Other objects, features, and advantages of this invention will be apparent to those skilled in the art from the following detailed description of preferred embodiments thereof together with the accompanying drawings in which.

Figure 1:
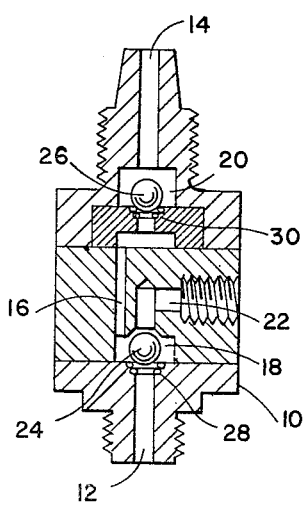
FIG. 1 is a sectional view of an air bleed valve incorporating the invention.
Figure 4:
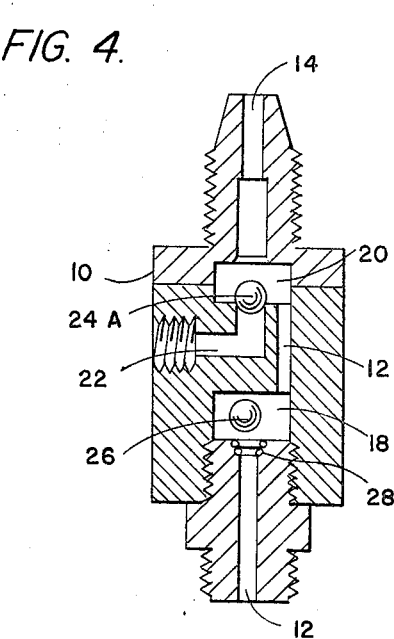
FIG. 4 is a sectional view of a syphon breaker valve incorporating the invention.

With reference to the drawings, particularly FIGS. 1 and 4, it will be seen that the valve body 10 essentially includes a pair of openings 12, 14 and flow channel 16 extending therebetween. Openings 12, 14 are axially aligned and channel 16 throughout the major portion of its length is offset to the side thereof communicating with the openings via the portions of channel 16, at cavities 18, 20, which are coaxial with openings 12, 14.

Vent 22 extends through the side of valve 10 and communicates with one of the cavities 18, 20 adjacent one of the openings 12, 14. The opening of vent 22 is coaxial with the adjacent said one opening and is of approximately the same diameter.

A ball check valve 24, 24A is provided in the cavity 18, 20 intermediate vent 22 and the adjacent opening. Another ball check valve 26 is provided in the cavity adjacent the other opening 12, 14.

In the embodiment illustrated in FIG. 1, an air bleed valve (automatic primer) is provided by arranging valve 10 in a vertical position with inlet opening 12 at the bottom thereof, vent 22 opening adjacent opening 12 into cavity 18, and outlet opening 14 at the top. In this embodiment, ball 24 has a specific gravity less than the liquid flowing through the valve 10 to float therein. O-ring seals 28, 30 are provided, respectively, at inlet opening 12 and below outlet opening 14, for properly seating balls 24, 26.

Figure 2:
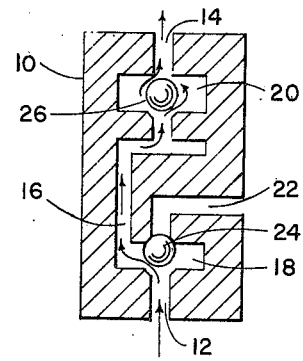
FIG. 2 is a diagrammatic representation of the valve shown in FIG. 1 showing one of its operating conditions.

In operation the air bleed valve is connected at the discharge side of a pump in the conventional manner. In normal operation, FIG. 2, ball 24 floats in the liquid, sealing vent 22, and ball 26, responsive to pressure, functions as a check valve.

Figure 3:
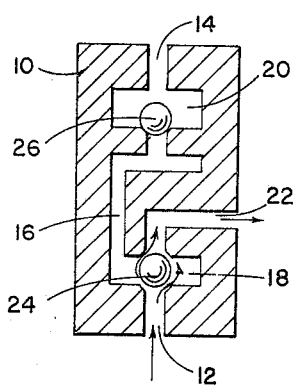
FIG. 3 is similar to FIG. 2 showing the valve in its other operating condition.

If prime is lost, FIG. 3, and air enters flow channel 16 at cavity 18, ball 24 falls opening vent 22 and sealing opening 12. Simultaneously ball 26 seals outlet opening 14 and prevents liquid backflow. Thereafter ball 24 acts as a pressure responsive check valve at opening 12 until liquid again enters through opening 12. Air is bled out through vent 22 until cavity 18 is again filled with liquid and ball 24 again seals the vent 22. Thereupon, valve 10 resumes normal operation.

In the syphon breaker embodiment of this invention, illustrated in FIG. 4, the arrangement of elements is similar to that of the air bleed valve embodiment except that vent 22 is inverted to open adjacent and below valve outlet 14 into cavity 20. Also, ball 24A is conventional rather than of the floating ball type 24 as in the alternate embodiment. Finally in this embodiment, flow into cavity 20 is on the side thereof rather than on the axis because of the axial positioning of vent 22.

Figure 5:
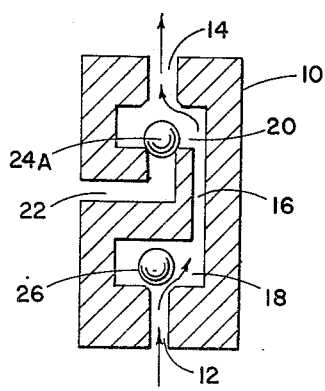
FIG. 5 is a diagrammatic representation of the valve shown in FIG. 4 showing one of its operating conditions.
Figure 6:
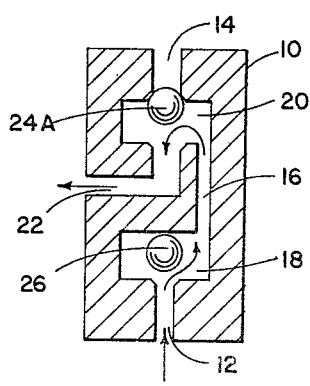
FIG. 6 is similar to FIG. 5 showing the valve in its other operating condition.

In operation, if pressure downstream of outlet 14 is reduced to a vacuum condition, FIG. 6, i.e., lower than atmosphere, vent 22 being open to the atmosphere, ball 26 seals outlet 14 and fluid flows out through vent 22 until the vacuum condition is eliminated, whereupon normal operation, FIG. 5, is resumed with ball 24A sealing vent 22. Ball 26 functions as a check valve.

The valve design thus provided in a simple and efficient manner provides reliable air bleed or syphon breaker valve. Because of the incorporation of check valves therein, either can be substituted for the usual discharge valve of a pump.

What is claimed is:
1. A valve comprising:
   a valve body having a liquid inlet opening, a liquid outlet opening, and a flow channel therebetween;
   a vent opening communicating through said valve body to said flow channel and vertically above said inlet opening;
   first pressure responsive ball closure means in said flow channel adjacent said inlet opening and said vent opening, said first ball closure means having a specific gravity less than that of the liquid to be passed through said valve, for normally maintaining said inlet opening open and said vent opening closed and for opening said vent opening and closing said inlet opening in response to pressure decrease; and second pressure responsive ball closure means in said flow channel adjacent said outlet opening for opening communication between said flow channel and said outlet opening in response to pressure increase and for closing communication between said flow channel and said outlet opening in response to pressure decrease.

2. The valve claimed in claim 1 in which said vent and inlet openings are coaxially positioned.

3. An air bleed valve comprising:

a valve body having inlet and outlet openings coaxially positioned in vertical arrangement, said inlet being at the bottom and said outlet being at the top thereof;

an elongated flow channel extending between said inlet and outlet;

a vent extending through said body having an opening in said flow channel coaxial with, adjacent, above and facing said inlet;

a ball check valve in said flow channel at said outlet opening communication between said flow channel and said outlet in response to pressure increase and closing communication between said flow channel and said outlet in response to pressure decrease; and a ball check valve, of specific gravity less than the liquid to be pumped through said valve, in said flow channel intermediate said inlet and said vent movable between said vent and said inlet normally floating to close said vent and to open said inlet and, in response to pressure decrease and loss of liquid falling to open said vent and to close said inlet.

4. An air bleed valve comprising:

a valve body having inlet and outlet openings coaxially positioned in vertical arrangement, said inlet being at the bottom and said outlet being at the top thereof;

an elongated flow channel extending between said inlet and outlet;

a vent extending through said body having an opening in said flow channel coaxial with, adjacent, below and facing said outlet;

a ball check valve in said flow channel at said inlet opening communication between said inlet and said flow channel in response to pressure increase and closing communication between said flow channel and said outlet in response to pressure decrease; and a ball check valve, of specific gravity greater than the liquid to be pumped through said valve, in said flow channel intermediate said outlet and said vent movable between said outlet and said vent normally closing said vent and opening said outlet and, in response to pressure decrease, opening said vent and closing said outlet.

5. A valve comprising:

a valve body having a liquid inlet opening, a liquid outlet opening, and a flow channel therebetween;

a vent opening communicating through said valve body to said flow channel adjacent and vertically below said outlet opening;

first pressure responsive ball closure means in said flow channel adjacent said outlet opening and said vent opening, said first ball closure means having a specific gravity greater than that of the liquid to be passed through said valve, for normally maintaining said outlet opening open and said vent opening closed and for opening said vent opening and closing said outlet opening in response to pressure decrease; and second pressure responsive ball closure means in said flow channel adjacent said inlet opening for opening communication between said flow channel and said inlet opening in response to pressure increase and for closing communication between said flow channel and said inlet opening in response to pressure decrease.

6. The valve claimed in claim 5 in which said vent and outlet openings are coaxially positioned.

References Cited

UNITED STATES PATENTS

| | | | |
|---|---|---|---|
| 1,373,505 | 4/1921 | Holland | 137—512 |
| 1,648,587 | 11/1927 | Moore | 137—512 X |
| 1,859,648 | 5/1932 | Baker | 137—512 X |
| 2,322,631 | 6/1943 | Groeniger | 137—218 |
| 2,329,368 | 9/1943 | Wood | 137—602 X |
| 2,809,659 | 10/1957 | Gillespie et al. | 137—512 |
| 3,081,730 | 3/1963 | Dvorachek | 137—512 X |
| Re. 26,235 | 7/1967 | Woodford | 137—218 |

ROBERT G. NILSON, Primary Examiner

U.S. Cl. X.R.

137—433, 512, 512.3